United States Patent
Abadeer et al.

(10) Patent No.: US 7,904,658 B2
(45) Date of Patent: Mar. 8, 2011

(54) STRUCTURE FOR POWER-EFFICIENT CACHE MEMORY

(75) Inventors: Wagdi W. Abadeer, Jericho, VT (US); George M. Braceras, Essex Junction, VT (US); John A. Fifield, Underhill, VT (US); Harold Pilo, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/851,128

(22) Filed: Sep. 6, 2007

(65) Prior Publication Data

US 2008/0040547 A1 Feb. 14, 2008

Related U.S. Application Data

(63) Continuation-in-part of application No. 11/164,656, filed on Nov. 30, 2005, now abandoned.

(51) Int. Cl.
G06F 12/00 (2006.01)
G06F 1/00 (2006.01)
G06F 1/26 (2006.01)
G11C 5/14 (2006.01)

(52) U.S. Cl. ......... 711/128; 711/118; 711/126; 711/129; 713/300; 713/320; 713/323; 713/324; 713/340; 365/226; 365/227

(58) Field of Classification Search .............. 365/226, 365/227; 711/118, 126, 128, 129; 713/300, 713/320, 323, 324, 340
See application file for complete search history.

(56) References Cited

U.S. PATENT DOCUMENTS

| | | | |
|---|---|---|---|
| 5,592,407 A | 1/1997 | Konishi et al. | |
| 5,761,715 A * | 6/1998 | Takahashi | 711/128 |
| 5,845,309 A | 12/1998 | Shirotori et al. | |
| 5,920,888 A | 7/1999 | Shirotori et al. | |
| 5,982,696 A | 11/1999 | Rao | |
| 6,779,163 B2 | 8/2004 | Bednar et al. | |
| 7,475,192 B2 * | 1/2009 | Correale et al. | 711/127 |
| 2003/0014597 A1 * | 1/2003 | van de Waerdt | 711/136 |
| 2004/0060024 A1 | 3/2004 | Bednar et al. | |
| 2005/0063211 A1 | 3/2005 | Atallah et al. | |
| 2005/0080994 A1 | 4/2005 | Cohen et al. | |

OTHER PUBLICATIONS

Selective Cache Ways: On-Demand Cache Resourse Allocation pp. 248-259, IEEE TC-MICRO 1999.*
D. Albonesi. "Selective Cache Ways: On demand Cache Resource Allocation", Micro 1999.*
Office Action for corresponding U.S. Appl. No. 11/164,656.

* cited by examiner

*Primary Examiner* — Kevin L Ellis
*Assistant Examiner* — Mehdi Namazi
(74) *Attorney, Agent, or Firm* — David Cain; Roberts Mlotkowski Safran & Cole, P.C.

(57) ABSTRACT

A design structure for a cache memory system (200) having a cache memory (204) partitioned into a number of banks, or "ways" (204A, 204B). The memory system includes a power controller (244) that selectively powers up and down the ways depending upon which way contains the data being sought by each incoming address (232) coming into the memory system.

21 Claims, 6 Drawing Sheets

STRUCTURE FOR POWER-EFFICIENT CACHE MEMORY

CROSS REFERENCE TO RELATED APPLICATIONS

The present application is a continuation in part of U.S. patent application Ser. No. 11/164,656, filed Nov. 30, 2005 now abandoned and titled, "POWER-EFFICIENT CACHE MEMORY SYSTEM AND METHOD THEREFOR", which is incorporated by reference in its entirety and assigned to the present assignee.

FIELD OF THE INVENTION

The present invention generally relates to the field of integrated circuits. In particular, the present invention is directed to a design structure for power-efficient cache memory.

BACKGROUND OF THE INVENTION

As the operating frequencies of microprocessors, integrated circuit (IC) memory, and other integrated circuitry continue to increase in conjunction with continually increasing integration scale and decreasing device feature sizes, power consumption and means for reducing such consumption of ICs are issues that are moving to the forefront of IC design. Of course, power consumption and reduction are issues with mobile IC-based devices, such as laptop computers, cell phones, PDAs, etc., that utilize batteries, but they are also issues of concern to devices that draw their power directly from the utility power grid.

Most of the power usage reducing techniques implemented in IC-based devices to date are generally directed to reducing active power consumption by systematically reducing the power provided to these devices during times when full power is not needed. For example, may IC-based devices typically have one or more reduced-power, or standby, modes, such as sleep mode, nap mode, doze, and hibernate modes, among others. However, in today's deep sub-micron technologies, standby power consumption itself is becoming a larger problem due to gate-tunneling and sub-threshold currents.

Figure 1A:
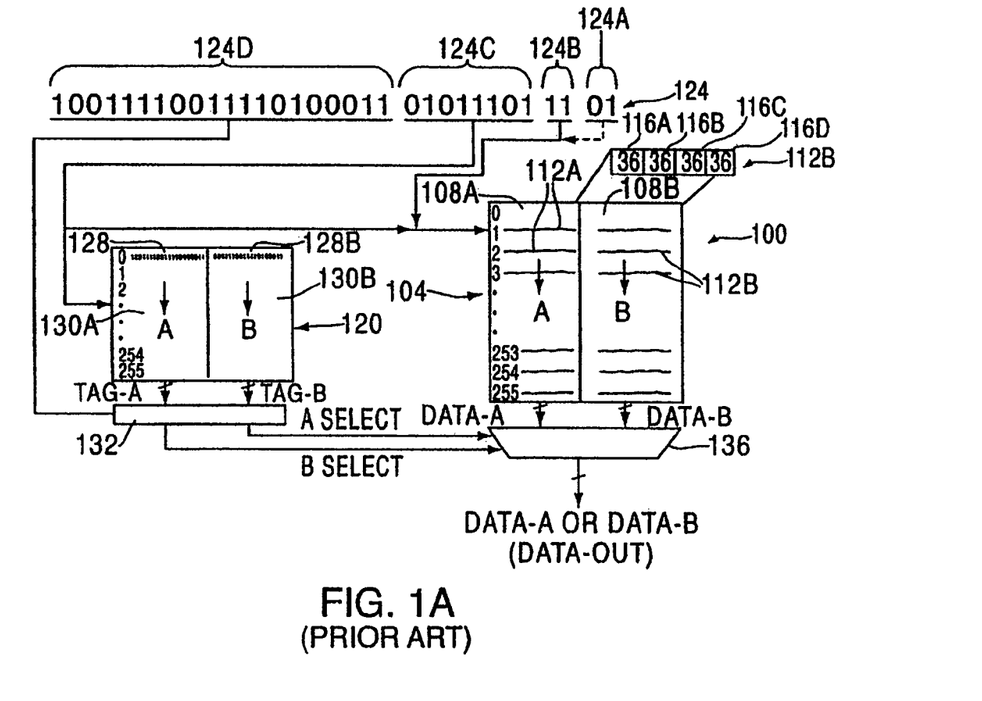
FIG. 1A is a high-level schematic diagram of a conventional cache memory system.

Various techniques have been implemented to reduce power consumption at the IC circuitry component level. For example, in the context of cache memory, the timing of the memory access is manipulated so as to reduce power consumption. The benefit of reduced power consumption, however, is realized at a slight cost to the speed of the cache memory. To illustrate, FIG. 1A shows a simple conventional two-way set-associative cache memory system 100 that includes a cache memory 104 partitioned into two banks, or ways 108A-B, each having 256 corresponding respective cache lines 112A-B that each contain thirty-six-bit words 116A-D. Generally, each cache line 112A-B contains a block of words transferred between a main memory (not shown) and cache memory 104 to take advantage of spatial locality. Cache memory 104 will store (as a function of cache storage rules not discussed herein) data or addresses for a subset of the total main memory. Cache memory system 100 also includes a tag directory 120 that will store the addresses for the data in cache memory 104. The contents of cache memory 104 is accessed as a function of an incoming address, e.g., address 124, received from outside memory system 100, e.g., from a microprocessor or microcontroller (not shown).

In this example, incoming address 124 is 32-bits long and is divided into the following parts: the two least-significant bits 124A select one of the four bytes in a particular word 116A-D; the next two bits 124B select one of the four words 116A-D within a particular cache line 112A-B; the fourth through the eleventh bits 124C ("cache line address bits") select a particular cache line 108A-B within cache memory 104; and the upper twenty bits 116D form a "tag" that is used in the cache retrieval process as described below. The lower twelve bits, i.e., bits 124A-C, of incoming address 124 are directly mapped from main memory into cache memory 104. The remaining 20 bits, i.e., tag bits 124D, of incoming address 124 are used to determine if a specific address has been stored in cache memory 104. The particulars of set-associate cache systems are well known and, therefore, are not described herein. However, in general, set associative cache systems, such as system 100 illustrated, allow multiple addresses having the same physical address (i.e., addresses of the lower twelve bits 124A-C) to be stored. In the two-way example of FIG. 1A, two identical addresses can be stored-one in way 108A and one in way 108B.

Generally, an access to cache memory 104 is initiated when a clock cycle captures incoming address 124 for use with tag directory 120 and the cache memory. Tag directory 120 receives the eight cache-line-address bits 124C of incoming address 124 and then outputs, from among the plurality of tags 128 stored in the tag directory, the two twenty-bit tags TAG-A, TAG-B corresponding to cache-line address expressed by the cache-line address bits. Of course, tags TAG-A, TAG-B are from corresponding tag sets 130A-B that correspond respectively to ways 108A-B of cache memory 104. Tags TAG-A, TAG-B feed from tag directory 120 into a comparator 132 that compares each of tags TAG-A, TAG-B to tag bits 124D of incoming address 124 to determine whether there is a match between the incoming tag bits and either of tags TAG-A, TAG-B. Essentially, comparator 132 determines if the data being sought via incoming address 124 is stored in cache memory 104.

A match of tag bits 124D to one of tags TAG-A, TAG-B means that the data sought by incoming address 124 is stored in cache memory 104 and there is a "cache hit." Correspondingly, comparator 132 identifies via ASELECT and BSELECT signals which one of ways 108A-B contains the data. That is, if tag bits 124D match tag TAG-A, ASELECT signal goes high while BSELECT signal remains low. Alternatively, if tag bits 124D match tag TAB-B, BSELECT signal goes high while ASELECT signal remains low. On the other hand, if tag bits 124D do not match either of tags TAG-A, TAG-B, then the data is not stored in cache memory 104 and there is a "cache miss."

In parallel with tag directory 120 receiving cache-line-address bits 124C, cache memory 104 receives the cache-line-address bits, as well as bits 124A (and, optionally, bits 124B) of incoming address 124 and subsequently output to a 2:1 multiplexer 136 the two 36-bit words (or optionally two bytes) DATA-A, DATA-B, i.e., one word (or byte) DATA-A from way 108A and one word (or byte) DATA-B from way 108B, corresponding to the cache lines 112A-B identified by cache-line-address bits 124C. If there is a cache hit, 2:1 multiplexer 136 will output either data DATA-A or data DATA-B as DATA-OUT, depending on which of ASELECT and BSELECT signals is high. Because tag directory 120 contains fewer bits than cache memory 104, its physical size is much smaller than the cache memory and, hence, it can be accessed faster than the cache memory.

Figure 1B:
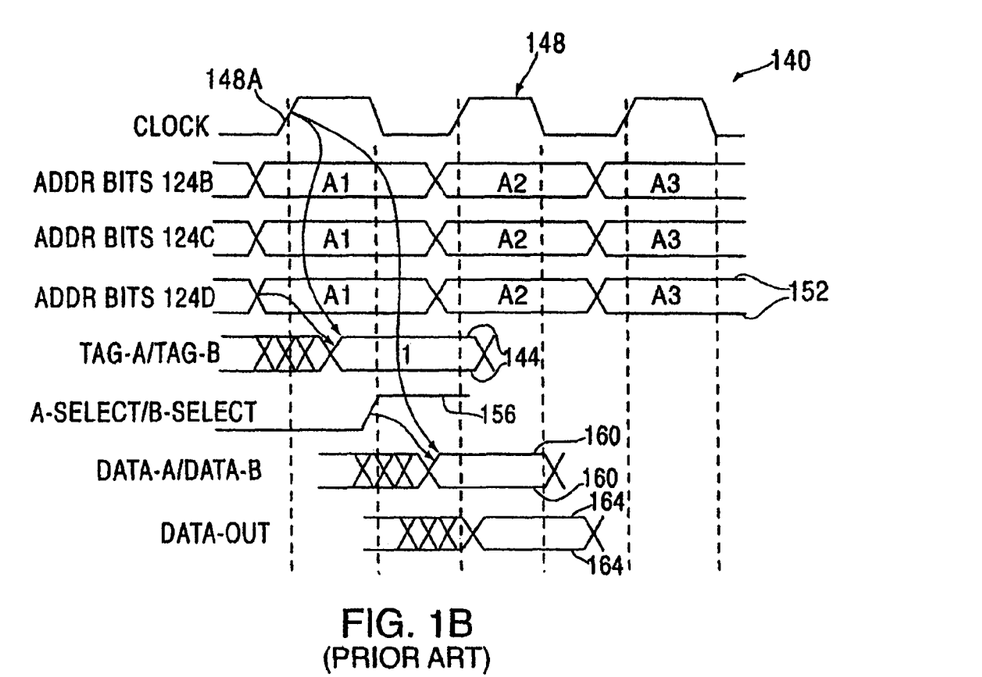
FIG. 1B is a timing diagram for the conventional cache memory system of FIG. 1A.

Referring to FIG. 1B, and also to FIG. 1A, FIG. 1B shows a timing diagram 140 illustrating the timing of various signals within cache memory system 100 of FIG. 1A for parallel access of tag directory 120 and cache memory 104. Such timing allows the smaller tag directory 120 to fetch tags TAG-A, TAG-B, and comparator 132 to compare tag bits 124D of incoming address 124 to tags TAG-A, TAG-B so as to activate either ASELECT or BSELECT signal, prior to cache memory 104 providing data DATA-A, DATA-B to multiplexer 136. In particular, this is illustrated by tag TAG-A/TAG-B signals 144 (activated in response to edge 148A of a clock signal 148 and address tag signals 152 of address bits 124D of incoming address A1) and an ASELECT/BSELECT signal 156 corresponding to one of ASELECT and BSELECT signals going high, both activating prior to data DATA-A/DATA-B signals 160 activating. After a delay caused by multiplexer 136, data-out signals 164 corresponding to either data DATA-A or data DATA-B are output by the multiplexer.

In this manner, the tag lookup and matching functions performed by tag directory 120 and comparator 132 can be accomplished with a minimum latency penalty to cache memory 104. The penalty for this architecture, however, is the power consumed by activating and accessing both of ways 108A-B of cache memory 104 to retrieve the desired data, i.e., either data DATA-A or data DATA-B. In order to save active power, some conventional architectures have waited on the access to tag directory 120 prior to accessing the desired bank, in this case way 108A or way 108B. This was done because, as mentioned above, power saving measures were focused on reducing active power consumption, which was the biggest problem in older technologies. Again, in today's deep sub-micron technologies, however, standby power consumption caused by gate-tunneling and sub-threshold currents is becoming a bigger problem.

SUMMARY OF THE INVENTION

One embodiment is directed to a design structure for a memory system responsive to an incoming address having a tag portion. The memory system comprises memory circuitry arranged into a plurality of ways and having a power-state. A tag directory contains a plurality of address tags forming a plurality of tag sets corresponding respectively to the plurality of ways. A tag matcher is configured to match the tag portion of the incoming address to a corresponding respective one of the plurality of address tags and, in response to finding a match, to output a way-select signal corresponding to the one of the plurality of tag sets of which the corresponding respective one of the plurality of address tags is part. A power controller is in communication with the plurality of ways and is responsive to the way-select signal so as to change the power-state of the memory circuitry.

In another embodiment, an example method of accessing a memory partitioned into a plurality of ways is provided. The method comprises receiving an incoming address having a tag portion. A plurality of tags are stored as a plurality of sets corresponding respectively to the plurality of ways of the memory. The tag portion is matched to one of the plurality of tags. A way-select signal is generated as a function of the match made in the preceding step, the way select signal corresponding to the one of the plurality of sets containing the one of the plurality of tags matched. Power supplied to the memory is controlled as a function of the way-select signal.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 2A:
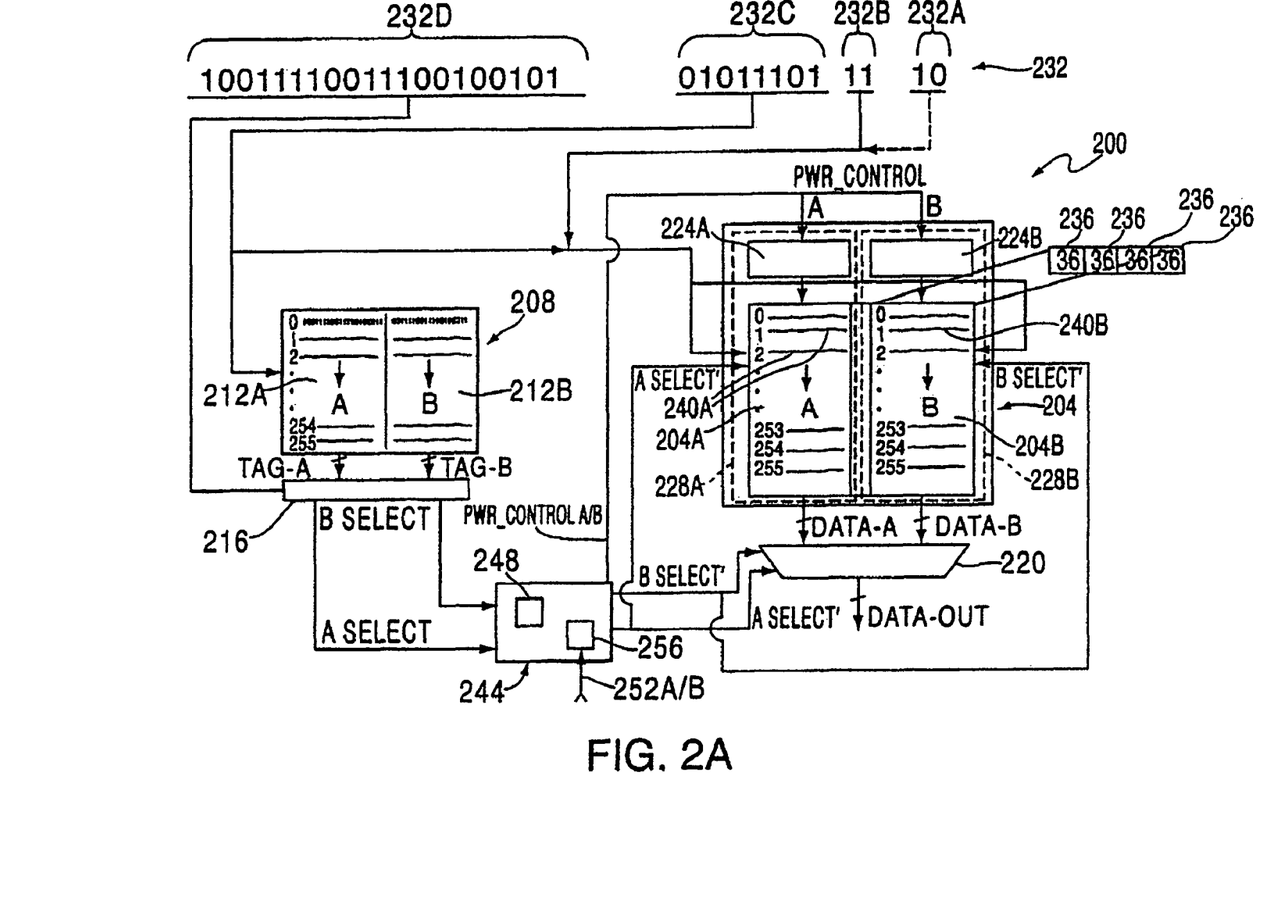
FIG. 2A is a high-level schematic diagram of a cache memory system of the present invention.

FIG. 2A illustrates a design structure of a cache memory system 200 made in accordance with the present invention. As discussed below in detail, cache memory system 200 may include a variety a features that reduce its power consumption, especially standby power consumption, relative to similar conventional cache memory systems, such as cache memory system 100 of FIG. 1A. For convenience and to particularly illustrate features of the present invention, the general configuration of cache memory system 200 of FIG. 2A is largely the same as the general configuration of cache memory system 100 of FIG. 1A. Both of cache memory system 100 and cache memory system 200 are two-way-associative memory systems. That is, cache memory system 200, like cache memory system 100, includes a cache memory 204 that is partitioned into two banks, or ways 204A-B, and a tag directory 208 containing a plurality of address tags 212 that fall into one or the other of two tag sets 212A-B that correspond respectively to the two ways (204A-B) of the cache memory.

In one embodiment, cache memory 204, tag directory 208, and other components of cache memory system 200, such as comparator 216 and multiplexer 220 may be identical to like components of cache memory system 100 of FIG. 1A, except for differences in cache memory 204 relating to their being powered by corresponding respective power systems 224A-B that effectively place banks 204A-B on separate voltage islands 228A-B. That said, in other embodiments, various ones of the particular devices shown may be replaced by other devices having a similar function. For example, comparator 216 may be replaced with a different type of matcher that may operate in a way different from conventional comparators so as to provide a match. Similarly, multiplexer 220 may be replaced with a different type of selector that may operate in a different way to identify the appropriate output of cache memory 204.

For the sake of convenience, cache memory system 200 may be considered, from an addressing standpoint, to work in largely the same manner as cache memory system 100 of FIG. 1A, including being set up for a 32-bit address 232 having two byte-bits 232A, two word-bits 232B, eight cache-line-address bits 232C, and twenty tag bits 232D. Correspondingly, each address tag 212 in tag directory 208 is twenty bits in length. Similarly, each word 236 on each cache line 240A-B in each of ways 204A-B may have the same 36-bit length as words 116A-D of cache memory system 100 of FIG. 1A. In the present example, each way 204A-B of cache memory 204 is configured to have 256 cache lines 240A-B (numbered 0-255 in FIG. 2A), which corresponds to the need to have eight cache-line-address bits 232C.

At a very high level the present invention is directed to actively controlling the power supplied to a memory, such as cache memory 204, having a plurality of ways, e.g., ways 204A-B, by selectively switching individual ones (or groups of ways) between a powered-up state and a powered-down state according to one or more predetermined rules. While various aspect and features of the present invention are described in the context of a two-way set associative memory, i.e., cache memory 204, having only two ways 204A-B, those skilled in the art will readily appreciate that the present invention may be implemented with a memory having virtually any number of ways or other partitioned segments that are capable of being selectively powered up and down.

Referring again to FIG. 2A, in the present example each cache line 240A-B contains a block of four words 236 that in each valid cache line have been loaded from a main memory (not shown) so as to take advantage of spatial locality of the data in those words. Cache memory 204 will store (as a function of cache storage rules not discussed herein, but well-known in the art) data or addresses for a subset of the total main memory. Tag directory 208 will store the addresses for the data that will be stored in cache memory 204. The contents of cache memory 204 is accessed as a function of an incoming address 232 received from outside cache memory system 200, e.g., from a microprocessor, microcontroller, or content-addressable memory (not shown), among other things.

In the present example incoming address 232 is 32-bits long and is divided into the following parts: the two least-significant bits 232A select one of the four bytes (not explicitly shown) in a particular word 236; the next two bits 232B select one of the four words 236 within a particular cache line 240A-B; the fourth through the eleventh bits 232C (i.e., "cache-line-address" bits) that designate a particular set of two cache lines 240A-B of the 256 cache lines (numbered 0-255 in FIG. 2A) stored in each way 204A-B of cache memory 204; and the upper twenty bits 232D form a "tag" that is used in the cache retrieval process as described below. The lower twelve bits, i.e., bits 232A-C, of incoming address 232 may be directly mapped from the main memory into cache memory 204. The remaining twenty bits, i.e., tag bits 232D, are used to determine whether a specific address has been stored in cache memory 204. As discussed in the Background section above, although the particulars of set-associate cache systems are well known and therefore not described herein, in general, set associative cache systems, such as system 200 illustrated, allow multiple addresses having the same physical address (i.e., addresses of the lower twelve bits 232A-C) to be stored. In the two-way set associative example of FIG. 2A, two identical such addresses can be stored-one in way 204A and one in way 204B.

As mentioned above, cache memory system 200 includes power systems 224A-B that allow ways 204A-B of cache memory 204 to be powered up and down independently of one another. In order to carry out a particular selective power plan for cache memory 204, memory system 200 may include a power controller 244 that is responsive to at least one tag set signal, e.g., tag set signals ASELECT, BSELECT, to selectively power up and down each of ways 204A-B via corresponding respective power systems 224A-B. Power controller 244 may comprise any suitable device(s), such a decoder 248 that is responsive to tag set signals ASELECT, BSELECT and generates one or more way-select signals, e.g., way-select signals PWR-CONTROL A/B, configured to trigger the appropriate one of power systems 224A-B and one or more selection signals, e.g., selection signals ASELECT', BSELECT', configured to initiate access of the appropriate cache line 240A-B and to cause multiplexer 220 to select the appropriate data DATA-A, DATA-B to output to DATA-OUT bus. Typically, relative to ways 204A-B ASELECT', BSELECT' signals are closely coupled with the address signals (not labeled) input into the ways.

In a basic embodiment, power controller 244 may be configured to simply power up the appropriate one of ways 204A-B as a function of the one of tag sets 212A-B in which the tag matching tag bits 232D of incoming address 232 falls. (Recall that if tag bits 232D match a tag in tag set 212A, then the data corresponding to incoming address 232 is in way 204A of cache memory 204. Conversely, if tag bits 232D match a tag in tag set 212B, then the desired data corresponding to incoming address is in way 204B.)

In more complex embodiments of a cache memory system of the present invention, the power controller of that system may be provided with other features in addition to or in lieu of the power up/power down feature just described. For example, in recognition that programs typically utilize stored information having temporal and spatial locality, the appropriate ways may be powered up and controlled to remain powered up for a predetermined period of time, e.g., thirty-two clock cycles, following the initial power up to retrieve particular data. This may be desirable in situations in which a program has a relatively high probability of requiring data from the same way during subsequent proximate address cycles. In this case, subsequent retrieval of data from that way while it remains powered up would not be subject to any latency period that may otherwise be caused by powering up that way specifically for that subsequent data retrieval. For example, in the context of cache memory system 200, say a first incoming address, e.g., address 232, requires data from way 204B and that initially both ways 204A-B are powered down. In this case, the first incoming address triggers the powering up of way 204B and the corresponding data is retrieved from that way. Then, power controller 244 will keep way 204B powered up for, say, the next thirty-two clock cycles. In this manner, all of the incoming addresses in those thirty-two clock cycles requiring data from way 204B will be able to access that data without any latency (discussed below) that may be caused by having to power up way 204B for each of the individual retrievals.

Another feature that may be implemented to maximize the speed of a memory system of the present invention would be to leave powered up a way that has already been powered up for a particular data retrieval until a subsequent incoming address requires a retrieval from a different way. Then, the different way may be powered up and remain powered up until a subsequent address requires data to be retrieved from a way different from the present way. In the context of cache memory system 200, assume that both ways 204A-B are initially powered down and that the first ten incoming addresses each require a retrieval from way 204A, the eleventh through fifteenth incoming addresses each require retrieval from way 204B, and the sixteenth through twenty-first incoming addresses each require retrieval from way 204A. In this case, power controller 244 will power up way 204A in response to the first incoming address and will keep way 204A powered up until the eleventh incoming address. In response to the eleventh incoming address, power controller 244 will power up way 204B, power down way 204A and keep way 204B powered up until the sixteenth incoming address, which will cause power controller to power up way 204A and power down way 204B. The various components of cache memory system 200 may be configured so that the system experiences a latency penalty only on retrievals corresponding to power-ups and not on retrievals made while the corresponding way 204A-B is already powered up. In the present example, this would mean that out of the twenty-one incoming addresses discussed, only three of the retrievals, i.e., the retrievals for the first, eleventh, and sixteenth incoming addresses, will have latency penalties, whereas the remaining eighteen retrievals, i.e., the retrievals for the second through tenth, twelfth through fifteenth, and seventeenth through twentieth incoming addresses will not have any latency penalty.

Figure 3:
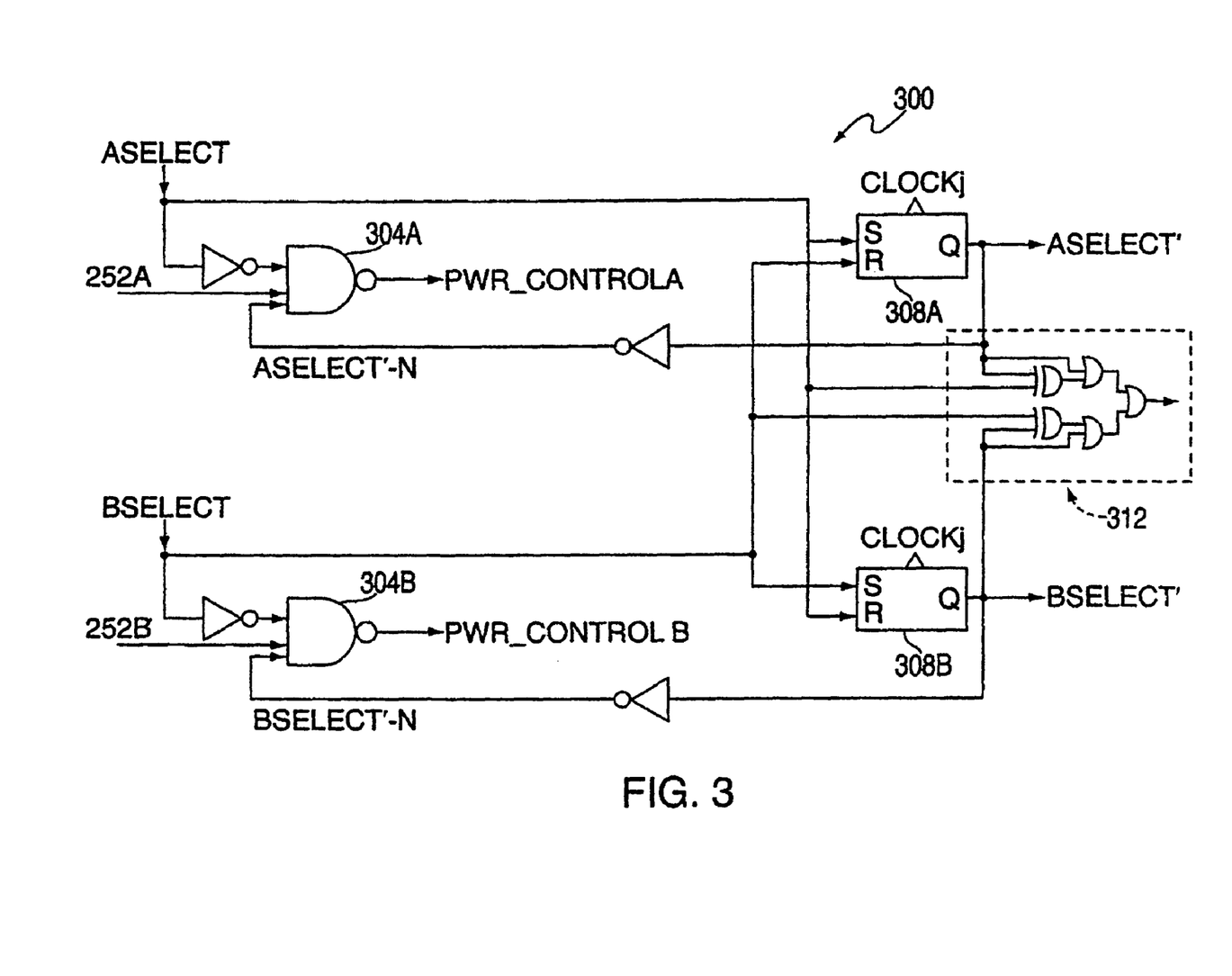
FIG. 3 is a schematic diagram of a power control circuit suitable for use in the power controller of FIG. 2A.

FIG. 3 illustrates an exemplary power control circuit 300 that may be implemented in power controller 244 of FIG. 2A. Referring to FIG. 3, and also to FIG. 2A, in power control circuit 300 tag set signals ASELECT, BSELECT output from comparator 216 are inverted and coupled to NAND gates 304A-B so as to provide, respectively, power control signals PWR_CONTROL A/B. Override signals 252A-B may be input into power controller 244 so as to provide an override means by which the corresponding way 204A-B can be held selected irrespective of the output of comparator 216, i.e., tag set signals ASELECT, BSELECT. Additional inputs ASELECT'_N, BSELECT'_N (FIG. 3) provide a means to keep the corresponding way 204A-B selected after it has been selected and until another way has been selected.

PWR_CONTROL A/B signals can flow either asynchronously from power control circuit 300 (and power controller 244) or in a clocked manner as desired to suit a particular design. The difference in timing between asynchronous and clocked flow is illustrated in the timing diagram 260 of FIG. 2B relative to PWR_CONTROL A/B signal 276. As shown asynchronous flow (illustrated by the dashed portion) can result in a time savings, since the flow of the PWR_CONTROL signal does not need to wait for the next clock cycle, in this case leading edge 272B on CLOCK signal 272. Once one of PWR_CONTROL A/B signals is asserted, a stabilization period of 1-2 clock cycles may be used to power up the selected way 204A-B for its access.

Referring again to FIGS. 3 and 2A, after a predetermined initialization period, clock signal CLOCKj (FIG. 3) is issued and is used to latch the active one of ASELECT, BSELECT signals into the corresponding respective one of Set-Reset latches 308A-B. The output of Set-Reset latches 308A-B, i.e., ASELECT', BSELECT' signals initiate the access of corresponding way 204A-B when selected and gate the selected data from multiplexer 220 to the DATA-OUT bus. In circuit 300, ASELECT' and BSELECT' signals output from Set-Reset latches 308A-B are inverted and fed back to the respective NAND gate 304A-B to keep an active way 204A-B powered up until a new incoming address 232 requires a different way to be enabled. An access to a presently unselected way 204A-B requires a wait period for a predetermined initialization time until CLOCKj is asserted. However, an access to an already selected way does not require a wait period.

Consequently, power control circuit 300 may be provided with early-access circuitry 312, e.g., an exclusive OR summing circuit, for comparing the power-on status of a group of ways 204A-B to ASELECT, BSELECT signals so as to predict the necessity of a wait period. The output of circuitry 300 is an EARLY_ACCESS signal that predicts if the appropriate way 204A-B is powered up so as to prevent the access delay incurred by the initialization period. EARLY_ACCESS signal can also be used to indicate to a memory controller (not shown) whether the next incoming address 232 should be streamed-in seamlessly or whether a predetermined cycle delay is necessary.

For example, if BSELECT signal becomes active after a tag comparison, the PWR_CONTROL B signal initializes way 204B, and, when CLOCKj is asserted, BSELECT signal is latched into latch 308B. At this point, BSELECT' signal is asserted and used by way 204B to gate the cache-line address and begin the memory access in way 204B. BSELECT' signal also directs output DATA-B through A/B multiplexer 220 to DATA-OUT bus. BSELECT' signal has also caused PWR_CONTROLB signal to remain active after tag set signals ASELECT, BSELECT have reset for the next cycle because it now controls NAND 304B. If in the next access cycle way 204B is selected again by BSELECT signal, the BSELECT' signal is already active, and way 204B is already powered on. EARLY_ACCESS signal is active high because early-active circuit 312 detected that BSELECT=BSELECT'=1 (active). By the states of BSELECT' and EARLY_ACCESS signals, the cache-line address can be gated to way 204B and selected data DATA-B directed to DATA-OUT bus without the initialization delay, and the memory controller can stream in the subsequent address without delay.

Conversely, if in the next access cycle, way 204A is selected, ASELECT signal will asynchronously (in this case) reset latch 32B and power down way 204B, by disabling BSELECT'. EARLY_ACCESS signal will deactivate and PWR_CONTROLA will become active. After way 204A is initialized, CLOCKJ will be asserted by the predetermined time period and the ASELECT' signal will be asserted. The access of way 204A will begin and the DATA-A will be selected by A/B multiplexer 220 and be present on DATA-OUT bus.

Yet another feature may keep a predetermined number (or percentage) of ways powered up at all times when the memory system in its "normal" operating mode, i.e., in the mode in which the memory system utilizes features of the present invention. In this manner, retrievals from the always-powered-up one(s) of way(s) will not have any latency penalty that may be attendant the selective powering and de-powering of the remaining way(s). For example, in the context of cache memory system 200, way 204A may be powered up at all times, with way 204B being powered up only as required to handle a corresponding retrieval.

Any of these and other features of a power controller of the present invention, such as power controller 244, may be complemented as desired with an override feature the same as or similar to the override feature implemented in power control circuit 300 via override signals 252A-B. Such an override feature can override the "normal" selective powering scheme being implemented with one or more other power modes, such as a "full power" mode in which all ways are powered up at all times. In the context of power controller 244, this override feature may be implemented using a mode selection signal 252 that triggers suitable circuitry 256 of the power controller to override the selective powering scheme implemented. Those skilled in the art will understand how to implement these and other similar features using standard circuit elements.

Figure 2B:
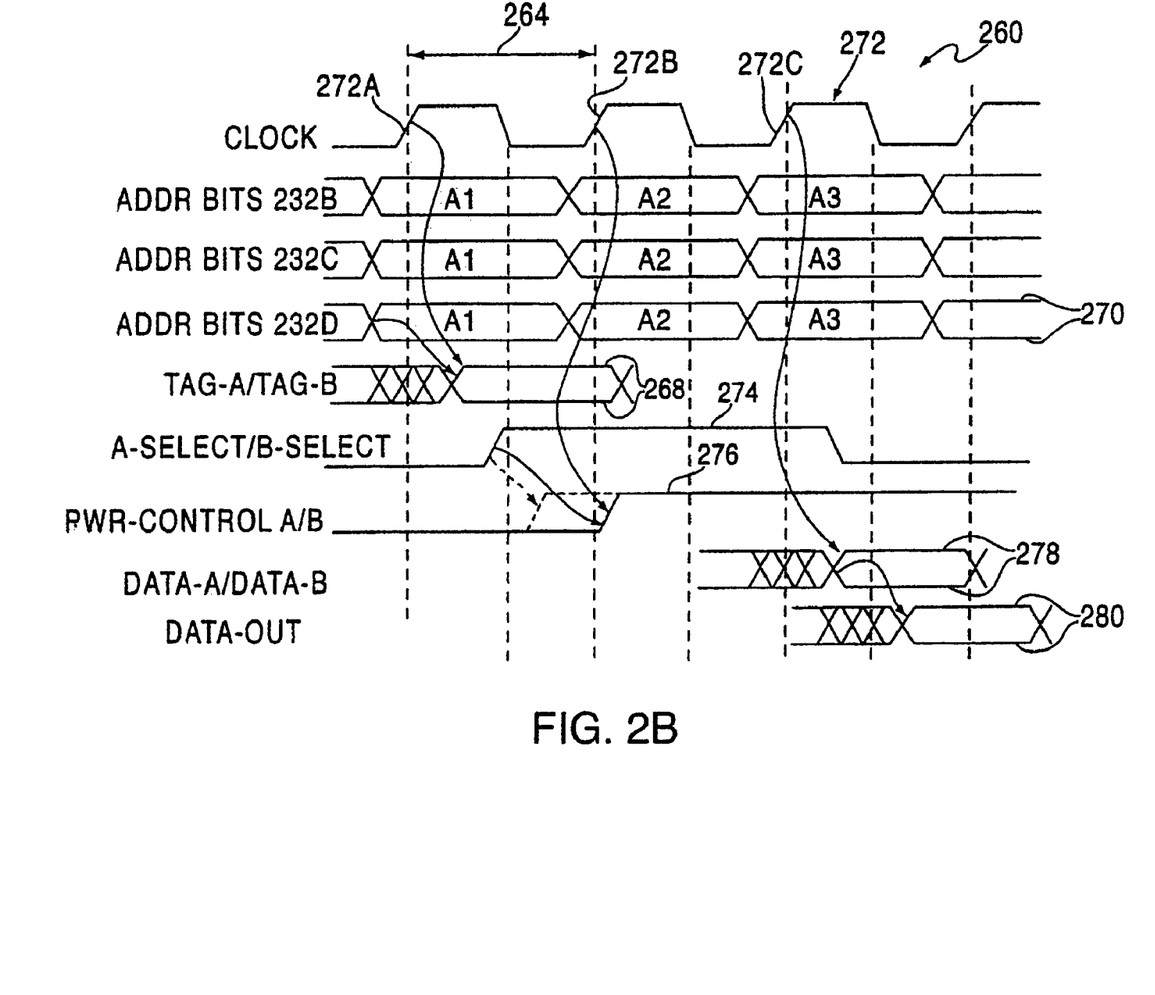
FIG. 2B is a timing diagram for the cache memory system of FIG. 2A.

Referring to FIG. 2A, and also to FIG. 2B that contains timing diagram 260 for cache memory system 200 of FIG. 2A, in the basic powering scheme mentioned above, an access to cache memory 204 is initiated when a clock cycle 264 captures an incoming address, such as address 232, for use with tag directory 208 and cache memory 204. Tag directory 208 receives the eight cache-line-address bits 232C of incoming address 232 and then outputs, from among the plurality of tags stored in the tag directory, the two twenty-bit tags TAG-A, TAG-B corresponding to cache-line address (one of 0-255) expressed by the cache-line address bits. The pushing of tags TAG-A, TAG-B into comparator 216 is represented by pushed-tags signal 268 of timing diagram 260 of FIG. 2A and is triggered off of address tag signals 270 and a leading edge 272A of clock signal 272. In this example, the pushing of tags TAG-A, TAG-B occurs within one clock cycle in the same manner as the conventional timing diagram 140 of FIG. 1A.

Of course, tags TAG-A, TAG-B are from corresponding tag sets 212A-B that correspond respectively to ways 204A-B of cache memory 204. Tags TAG-A, TAG-B feed from tag directory 208 into a "double-comparison" comparator 216 that compares each of tags TAG-A, TAG-B to tag bits 232D of incoming address 232 to determine whether there is a match between the incoming tag bits and either of tags TAG-A, TAG-B. Essentially, comparator 216 determines if the data being sought via incoming address 232 is stored in cache memory 204 and, if so, which way 204A-B contains the data. The term "double-comparison" used in connection with comparator 216 denotes that the comparator is configured to perform two comparisons simultaneously, one for each of tag sets 212A-B. In an eight-way set associative memory system, the comparator may be an octal-comparison comparator that simultaneously performs eight comparisons, one for each tag-set. In general, in an N-way set associative memory system, the comparator may be an N-comparison comparator.

A match of tag bits 232D to one of tags TAG-A, TAG-B means that the data corresponding to incoming address 232 is stored in cache memory 204 and there is a "cache hit." Correspondingly, comparator 216 identifies to power controller 244, via ASELECT and BSELECT signals, which one of ways 204A-B contains the data. That is, if tag bits 232D match tag TAG-A, comparator 216 activates ASELECT signal while BSELECT signal remains inactive. Alternatively, if tag bits 232D match tag TAB-B, comparator 216 activates BSELECT signal while ASELECT signal remains inactive. In the present example, as shown in FIG. 2B, comparator 216 (FIG. 2A) outputs a select signal 274 (either ASELECT or BSELECT signal) within the same clock cycle as the pushing of tags TAG-A, TAG-B into the comparator. On the other hand, if tag bits 232D do not match either of tags TAG-A, TAG-B, then the data is not stored in cache memory 204 and there is a "cache miss." Cache misses may be dealt with in any suitable conventional manner well known in the art.

After comparator 216 has activated either ASELECT or BSELECT signal, power controller 244 activates the corresponding power system 224A-B on the next leading edge 272B of clock signal 272 as shown in FIG. 2B with PWR-CONTROL signal 276 and controls the access and output of data from cache memory 204 via ASELECT', BSELECT' signals. In response to PWR-CONTROL signal 276, the corresponding one of power systems 224A-B powers up and increases the voltage to the corresponding way 204A-B to prepare that way for a data retrieval. The powering up of the appropriate way 204A-B typically takes time to stabilize. After the powered-up way 204A-B stabilizes, e.g., on the next leading edge 272C of clock signal 272, the appropriate data, either data DATA-A or data DATA-B is driven into multiplexer 220 as represented by DATA-A/DATA-B signals 278. Thereafter, multiplexer 220 outputs the appropriate data DATA-A, DATA-B onto DATA-OUT bus as a function of either ASELECT' signal or BSELECT' signal, as the case may be, at some later time. This is represented by DATA-OUT signals 280 in timing diagram 260 of FIG. 2B. Like comparator 216 discussed above, for an N-way set associative memory system, multiplexer 220 may be an N:1 multiplexer to simultaneously receive N pieces of data from the N ways.

As can be readily seen from timing diagram 260 of FIG. 2B, DATA-OUT signal 280 has roughly a two-clock-cycle latency penalty relative to DATA-OUT signals 164 of FIG. 1A. For many computer programs this latency penalty is not likely to impact the performance of the device containing cache memory system 200 of FIG. 2A in any significant manner. As discussed above, for critical computer programs or portions thereof needing to avoid the latency penalty, the selective powering scheme can be overridden. In addition, those skilled in the art may be able to design memory systems in accordance with the present invention that have a shorter or effectively no latency penalty that the latency penalty shown. Of course, implementation of one or more of the above-discussed alternative features will typically reduce any latency penalty accompanying a particular design.

Figure 4:
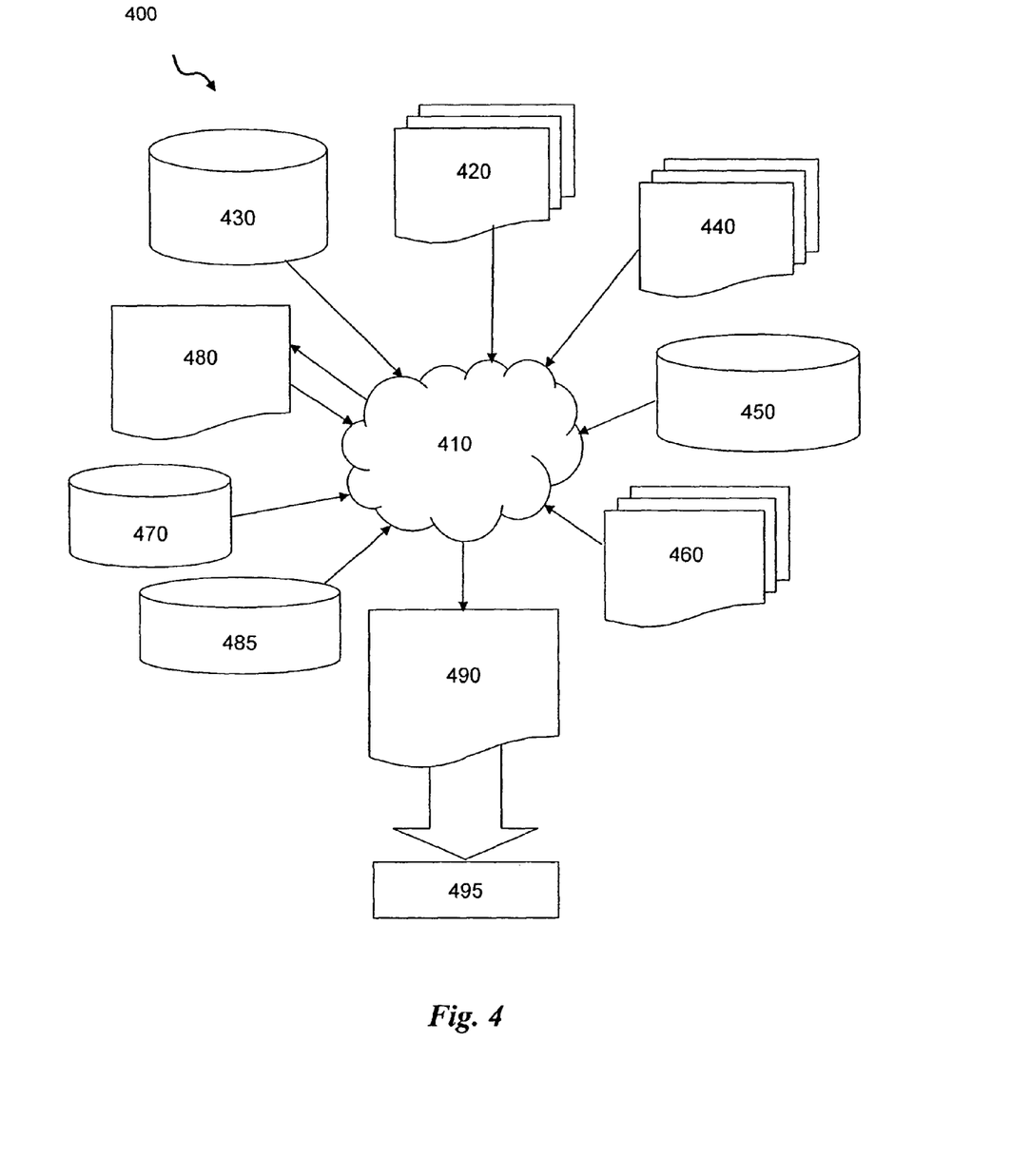
FIG. 4 is a block diagram of a design flow process for designing a cache memory system.

FIG. 4 shows a block diagram of an example design flow 400. Design flow 400 may vary depending on the type of IC being designed. For example, a design flow 400 for building an application specific IC (ASIC) may differ from a design flow 400 for designing a standard component. Design structure 420 is preferably an input to a design process 410 and may come from an IP provider, a core developer, or other design company or may be generated by the operator of the design flow, or from other sources. Design structure 420 comprises cache memory system 200 in the form of schematics or HDL, a hardware-description language (e.g., Verilog, VHDL, C, etc.). Design structure 420 may be contained on one or more machine readable medium. For example, design structure 420 may be a text file or a graphical representation of cache memory system 200. Design process 410 preferably synthesizes (or translates) circuit 200 into a netlist 480, where netlist 480 is, for example, a list of wires, transistors, logic gates, control circuits, I/O, models, etc. that describes the connections to other elements and circuits in an integrated circuit design and recorded on at least one of machine readable medium. This may be an iterative process in which netlist 480 is resynthesized one or more times depending on design specifications and parameters for the system.

Design process 410 may include using a variety of inputs; for example, inputs from library elements 430 which may house a set of commonly used elements, circuits, and devices, including models, layouts, and symbolic representations, for a given manufacturing technology (e.g., different technology nodes, 32 nm, 45 nm, 90 nm, etc.), design specifications 440, characterization data 450, verification data 460, design rules 470, and test data files 485 (which may include test patterns and other testing information). Design process 410 may further include, for example, standard circuit design processes such as timing analysis, verification, design rule checking, place and route operations, etc. One of ordinary skill in the art of integrated circuit design can appreciate the extent of possible electronic design automation tools and applications used in design process 410 without deviating from the scope and spirit of the invention. The design structure of the invention is not limited to any specific design flow.

Ultimately, design process 410 preferably memory system 200, along with the rest of the integrated circuit design (if applicable), into a final design structure 490 (e.g., information stored in a GDS (global distribution system) storage medium). Final design structure 490 may comprise information such as, for example, test data files, design content files, manufacturing data, layout parameters, wires, levels of metal, vias, shapes, test data, data for routing through the manufacturing line, and any other data required by a semiconductor manufacturer to produce cache memory system 200. Final design structure 490 may then proceed to a stage 495 where, for example, final design structure 490: proceeds to tape-out, is released to manufacturing, is sent to another design house or is sent back to the customer.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

What is claimed is:

1. A design structure embodied in a machine readable medium, the design structure comprising:
   a memory system responsive to an incoming address having a tag portion, comprising:
   (a) memory circuitry arranged into a plurality of independently powerable memory ways and having a power-state including a powered up and powered down state at any given time during use so as to collectively provide said plurality of independently powerable memory ways with a particular power state at the give time, independent of each of said plurality of independently powerable memory ways;
   (b) a tag directory containing a plurality of address tags forming a plurality of tag sets corresponding respectively to said plurality of independently powerable memory ways;
   (c) a tag matcher configured to match the tag portion of the incoming address to a corresponding respective one of said plurality of address tags and, in response to finding a match, to output a way-select signal corresponding to the one of said plurality of tag sets of which said corresponding respective one of said plurality of address tags is part; and
   (d) a power controller in communication with said plurality of independently powerable memory ways and responsive to said way-select signal so as to change said power-state of said memory circuitry, independent of each of the independently powerable memory ways such that said power-up state provides access to data stored in at least one said plurality of independently powerable memory ways, and said power-down state limits access to data stored in said at least one of said plurality of independently powerable memory ways without losing or corrupting of data, wherein:
   in the power controller, tag set signals ASELECT, BSELECT output from a comparator are inverted and coupled to NAND gates so as to provide, respectively, power control signals PWR_CONTROL A/B;
   override signals are input into the power controller so as to provide an override means by which a corresponding independently powerable memory way can be held selected irrespective of an output of the comparator which is tag set signals ASELECT, BSELECT and additional inputs ASELECT'_N, BSELECT'_N provide a means to keep the corresponding independently powerable memory way selected after it has been selected and until another independently powerable memory way has been selected;
   PWR_CONTROL A/B signals flow either asynchronously from the power controller or in a clocked manner, wherein in the asynchronous flow, the flow of the PWR_CONTROL A/B signal does not need to wait for a next clock cycle;
   once one of the PWR_CONTROL A/B signals is asserted, a stabilization period of N clock cycles is used to power up the selected independently powerable memory way for its access;
   after a predetermined initialization period, clock signal CLOCKj is issued and is used to latch the active one of ASELECT, BSELECT signals into a corresponding respective one of Set-Reset latches, wherein an output of the Set-Reset latches ASELECT', BSELECT' signals initiate access of the corresponding independently powerable memory way when selected and gates selected data from a multiplexer to a DATA-OUT bus; and
   the ASELECT' and BSELECT' signals output from the Set-Reset latches are inverted and fed back to a respective NAND gate to keep an active independently powerable memory way powered up until a new incoming address requires a different independently powerable memory way is to be enabled.

2. The design structure according to claim 1, further comprising a plurality of voltage islands each powering a corresponding respective one of said plurality of independently powerable memory ways.

3. The design structure according to claim 2, wherein said power controller is configured to selectively turn on a corresponding respective one of said plurality of voltage islands in response to said way-select signal.

4. The design structure according to claim 1, wherein each of said plurality of independently powerable memory ways is initially powered down and said power controller is configured to power up the one of said plurality of independently powerable memory ways corresponding to said way-select signal in response to said way-select signal independent of each other.

5. The design structure according to claim 4, wherein the memory system is subjected to a plurality of read cycles and said power controller is configured to keep the one of said plurality of independently powerable memory ways corresponding to said way-select signal powered up for more than one of said plurality of read cycles.

6. The design structure according to claim 1, wherein the memory system has a powered-up mode and said memory circuitry comprises a number N of ways and wherein said power controller is configured to keep fewer than N of said independently powerable memory ways powered up at all times during said powered-up mode.

7. The design structure according to claim 6, wherein said power controller is configured to keep about 50% of said independently powerable memory ways powered up at all times during said powered-up mode.

8. The design structure according to claim 1, wherein said plurality of tags comprises a number N of tag sets and wherein said tag matcher comprises an N-comparison comparator.

9. The design structure according to claim 1, wherein said memory circuitry comprises a number N of ways and an output, and the memory system further comprises an N:1 multiplexer in communication with said output and responsive to said way-select signal.

10. The design structure of claim 1, wherein the design structure comprises a netlist of the cache memory system.

11. The design structure of claim 1, wherein the design structure resides in a GDS (global distribution system) storage medium.

12. The design structure of claim 1, wherein the design structure comprises a plurality of test data, characterization data, manufacturing data, or design specifications.

13. The design structure of claim 1, wherein:
   an access to a presently unselected independently powerable memory way requires a wait period for a predetermined initialization time until CLOCKj is asserted, and an access to the already selected independently powerable memory way does not require a wait period.

14. The design structure of claim 13, wherein:
   the power controller is provided with early-access circuitry including an exclusive OR summing circuit, for comparing power-on status of a group of independently powerable memory ways to the ASELECT, BSELECT signals so as to predict a necessity of the wait period; and
   the output of her early access circuitry is an EARLY_ACCESS signal that predicts if an appropriate independently powerable memory way is powered up so as to prevent access delay incurred by the initialization period.

15. The design structure of claim 14, wherein:
if the BSELECT signal becomes active after a tag comparison, the PWR_CONTROL B signal initializes a selected independently powerable memory way, and, when CLOCKj is asserted, the BSELECT signal is latched into the latch;
the BSELECT' signal is asserted and used by the selected independently powerable memory way to gate the cache-line address and begin memory access in the selected independently powerable memory way;
the BSELECT' signal also directs output DATA-B through A/B multiplexer to DATA-OUT bus; and
the BSELECT' signal causes the PWR_CONTROLB signal to remain active after the tag set signals ASELECT, BSELECT have reset for the next cycle, thereby if in a next access cycle the selected independently powerable memory way way is selected again by BSELECT signal, the BSELECT' signal is already active, and the selected independently powerable memory way is already powered on.

16. A design structure for accessing a memory partitioned into a plurality of ways, comprising:
(a) a means for receiving an incoming address having a tag portion;
(b) a means for storing a plurality of tags as a plurality of sets corresponding respectively to the plurality of independently powerable memory ways of the memory;
(c) a means for matching said tag portion to one of said plurality of tags;
(d) a means for generating a way-select signal as a function of the match made in step (c), said way select signal corresponding to the one of said plurality of sets containing the one of said plurality of tags matched in step (c);
(e) a means for controlling power supplied to the memory as a function of said way-select signal;
(f) means for powering up one of the plurality of independently powerable memory ways of the memory corresponding to the one of said plurality of sets containing the one of said plurality of tags matched in step (c), independent of each of the independently powerable memory ways; and
(g) means for retrieving, from the one of the plurality of independently powerable memory ways, data stored in the one of the plurality of independently powerable memory ways prior to step (f), wherein:
in the means for controlling power, tag set signals ASELECT, BSELECT output from a comparator are inverted and coupled to NAND gates so as to provide, respectively, power control signals PWR_CONTROL A/B;
override signals are input into the means for controlling power so as to provide an override means by which a corresponding independently powerable memory way can be held selected irrespective of an output of the comparator which is tag set signals ASELECT, BSELECT and additional inputs ASELECT'_N, BSELECT'_N provide a means to keep the corresponding independently powerable memory way selected after it has been selected and until another independently powerable memory way has been selected;
PWR_CONTROL A/B signals flow either asynchronously from the means for controlling power or in a clocked manner, wherein in the asynchronous flow, the flow of the PWR_CONTROL A/B signal does not need to wait for a next clock cycle;
once one of the PWR_CONTROL A/B signals is asserted, a stabilization period of N clock cycles is used to power up the selected independently powerable memory way for its access;
after a predetermined initialization period, clock signal CLOCKj is issued and is used to latch the active one of ASELECT, BSELECT signals into a corresponding respective one of Set-Reset latches, wherein an output of the Set-Reset latches ASELECT', BSELECT' signals initiate access of the corresponding independently powerable memory way when selected and gates selected data from a multiplexer to a DATA-OUT bus; and
the ASELECT' and BSELECT' signals output from the Set-Reset latches are inverted and fed back to a respective NAND gate to keep an active independently powerable memory way powered up until a new incoming address requires a different independently powerable memory way is to be enabled.

17. The design structure according to claim 16, wherein the memory is subjected to a plurality of read cycles and the means for controlling power supplied to the memory powers-up the one of the plurality of independently powerable memory ways of the memory corresponding to the one of said plurality of sets containing the one of said plurality of tags matched in step (c) for more than one of said plurality of read cycles.

18. The design structure according to claim 16, wherein the memory has a powered-up mode and is partitioned into a number N of ways, and the design structure further comprises means for keeping fewer than N of said independently powerable memory ways powered up at all times during said powered-up mode.

19. A design structure, embodied in a machine readable medium, for a memory system responsive to an incoming address having a tag portion, the design structure comprising:
(a) memory circuitry arranged into a number N of independently powerable memory ways and having a power-state including a powered up and powered down state so as to collectively provide said plurality of independently powerable memory ways with a particular power state at a give time, said memory circuit being configured to retain data stored in ones of said N of independently powerable memory ways when ones of said N of independently powerable memory ways are powered down;
(b) a tag directory containing a plurality of address tags forming N tag sets corresponding respectively to said N independently powerable memory ways;
(c) an N-comparison comparator configured to match the tag portion of the incoming address to a corresponding respective one of said plurality of address tags N of said plurality of address tags at a time and, in response to finding a match, to output a way-select signal corresponding to the one of said plurality of tag sets of which said corresponding respective one of said plurality of address tags is part; and
(d) a power controller in communication with said plurality of independently powerable memory ways and responsive to said way-select signal so as to change said power-state of said memory circuitry independent of each of the independently powerable memory ways, wherein:
in the power controller, tag set signals ASELECT, BSELECT output from a comparator are inverted and coupled to NAND gates so as to provide, respectively, power control signals PWR_CONTROL A/B;

override signals are input into the power controller so as to provide an override means by which a corresponding independently powerable memory way can be held selected irrespective of an output of the comparator which is tag set signals ASELECT, BSELECT and additional inputs ASELECT'_N, BSELECT'_N provide a means to keep the corresponding independently powerable memory way selected after it has been selected and until another independently powerable memory way has been selected;

PWR_CONTROL AM signals flow either asynchronously from the power controller or in a clocked manner, wherein in the asynchronous flow, the flow of the PWR_CONTROL A/B signal does not need to wait for a next clock cycle;

once one of the PWR_CONTROL A/B signals is asserted, a stabilization period of N clock cycles is used to power up the selected independently powerable memory way for its access;

after a predetermined initialization period, clock signal CLOCKj is issued and is used to latch the active one of ASELECT, BSELECT signals into a corresponding respective one of Set-Reset latches, wherein an output of the Set-Reset latches ASELECT', BSELECT' signals initiate access of the corresponding independently powerable memory way when selected and gates selected data from a multiplexer to a DATA-OUT bus; and the ASELECT' and BSELECT' signals output from the Set-Reset latches are inverted and fed back to a respective NAND gate to keep an active independently powerable memory way powered up until a new incoming address requires a different independently powerable memory way is to be enabled.

20. The design structure according to claim 19, further comprising N voltage islands each powering a corresponding respective one of said N ways.

21. The design structure according to claim 20, wherein said power controller is configured to selectively turn on a corresponding respective one of said N voltage islands in response to said way-select signal.

* * * * *